May 14, 1940.                T. A. KEEN                  2,200,504
                             STARTING BOX
                         Filed Nov. 5, 1937           3 Sheets-Sheet 1
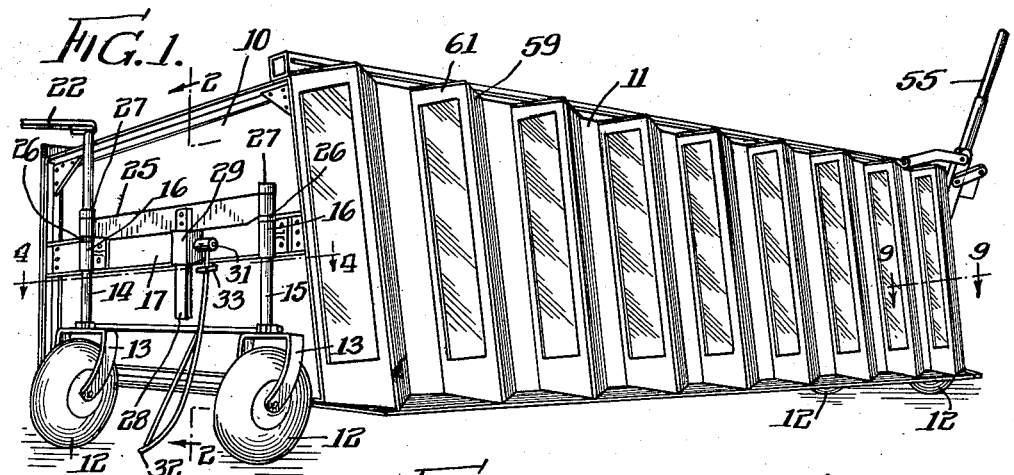
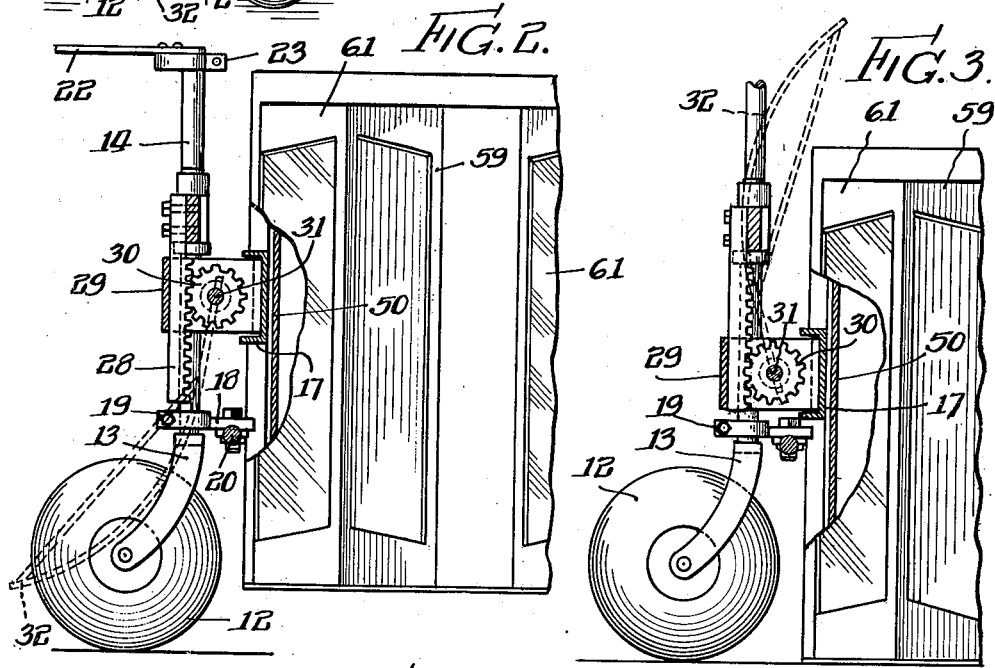
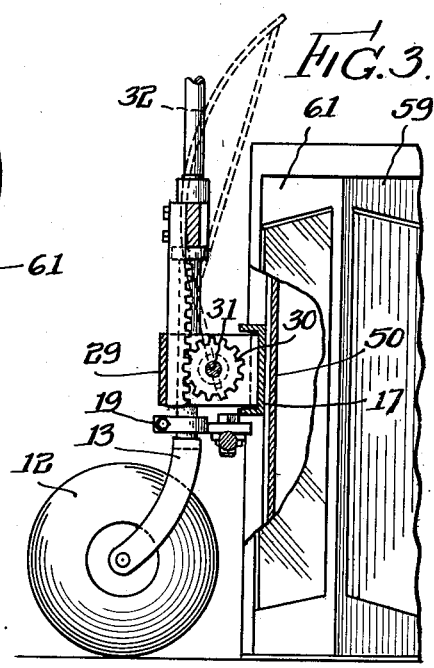
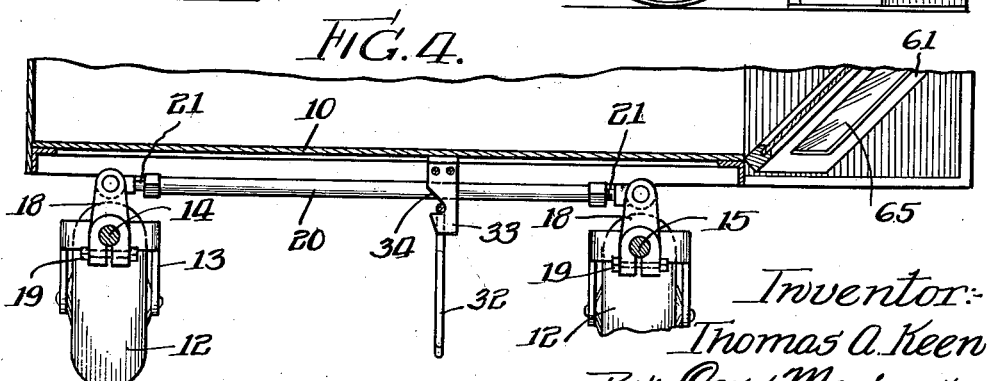
Inventor:-
Thomas A. Keen
By:- Cox & Moore attys.

May 14, 1940.  T. A. KEEN  2,200,504
STARTING BOX
Filed Nov. 5, 1937  3 Sheets-Sheet 2

Inventor:-
Thomas A. Keen
By:- Cox & Moore attys.

May 14, 1940.   T. A. KEEN   2,200,504
STARTING BOX
Filed Nov. 5, 1937   3 Sheets-Sheet 3
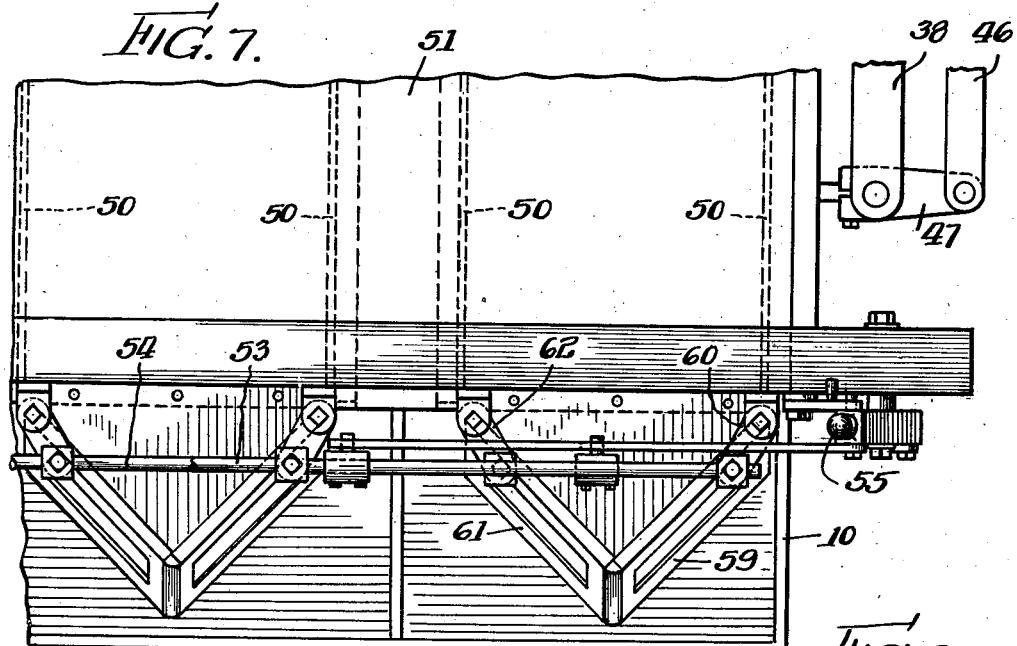
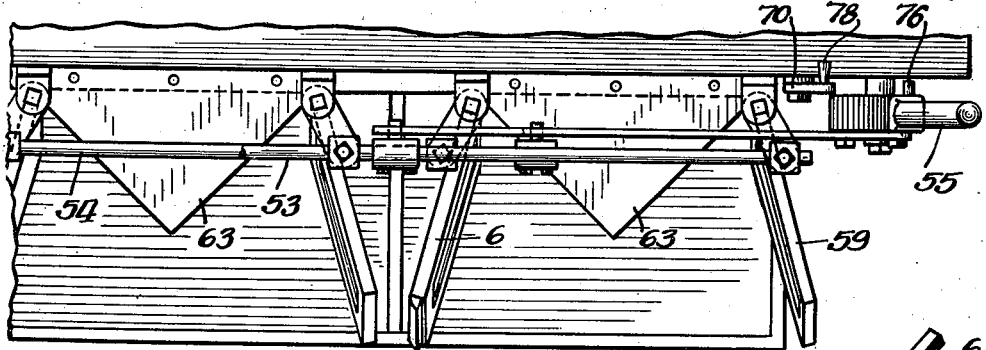
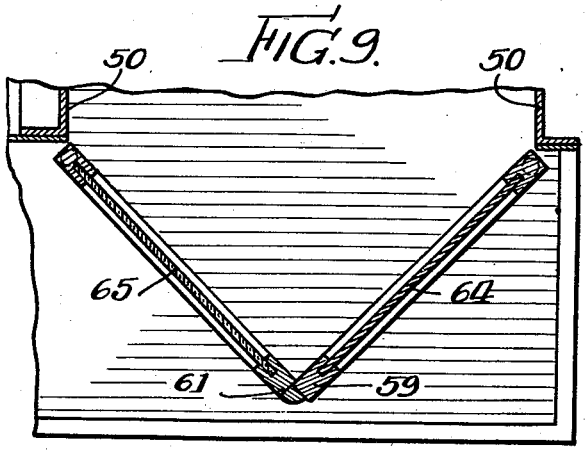
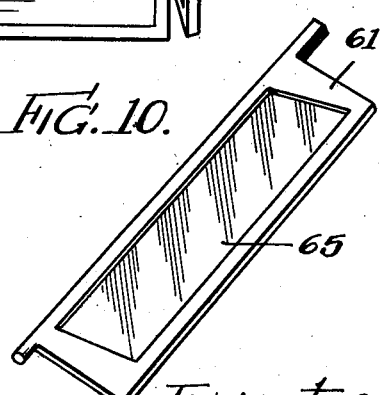
Inventor
Thomas A. Keen
By:- Cox & Moore
attys.

Patented May 14, 1940

2,200,504

UNITED STATES PATENT OFFICE 2,200,504

STARTING BOX

Thomas A. Keen, San Mateo, Calif., assignor to Hannah M. Smith, River Forest, Ill.

Application November 5, 1937, Serial No. 172,987

7 Claims. (Cl. 119—15.5)

This invention relates to starting devices, and more particularly to starting devices or boxes of the type used for dog races or the like.

It is an object of the invention to provide a new and improved starting box construction which constitutes a very efficient and mobile unit, and which has improved operating characteristics. More particularly, it is an object to provide a starting box which may be readily and efficiently transported from place to place as the occasion may require, but which, when used as a starting inclosure for the racing animals, such as dogs, may be firmly and accurately supported in desired position. In accordance with the invention, the box is provided with wheels and associated steering mechanism by which it may be readily transported from place to place, and it is further provided with mechanism for raising the wheels relative to the box whereby the box proper can be lowered into engagement with the ground to afford a solid supporting arrangement.

It is a further object of the invention to provide an improved construction for the doors through which the racing dogs or the like pass at the start of a race. In accordance with the invention the doors open rapidly, they direct the dogs' attention in a direction toward the lure, and they obstruct vision between the several dog compartments so that the dogs will not distract each other's attention.

Other objects and advantages of the invention will be apparent from the following description when taken in connection with the accompanying drawings wherein certain preferred embodiments of the invention are illustrated.

In the drawings, wherein like reference numerals refer to like parts throughout:

Fig. 1 is a perspective view of a starting box constructed in accordance with one embodiment of the invention.

Fig. 2 is a sectional view of one end of the box, taken on the line 2—2 of Fig. 1.

Fig. 3 is a view similar to Fig. 2 but showing the wheels in raised or non-active position relative to the box.

Fig. 4 is a sectional view through the wheel assembly on the line 4—4 of Fig. 1.

Fig. 7 is a partial top view illustrating the doors and their operating mechanism.

Fig. 8 is a view similar to Fig. 7, but showing the doors in open position.

Fig. 9 is a detail view showing the positioning of the doors when closed, taken on the line 9—9 of Fig. 1, and Fig. 10 is a perspective detail of one of the door members.

Figure 5:
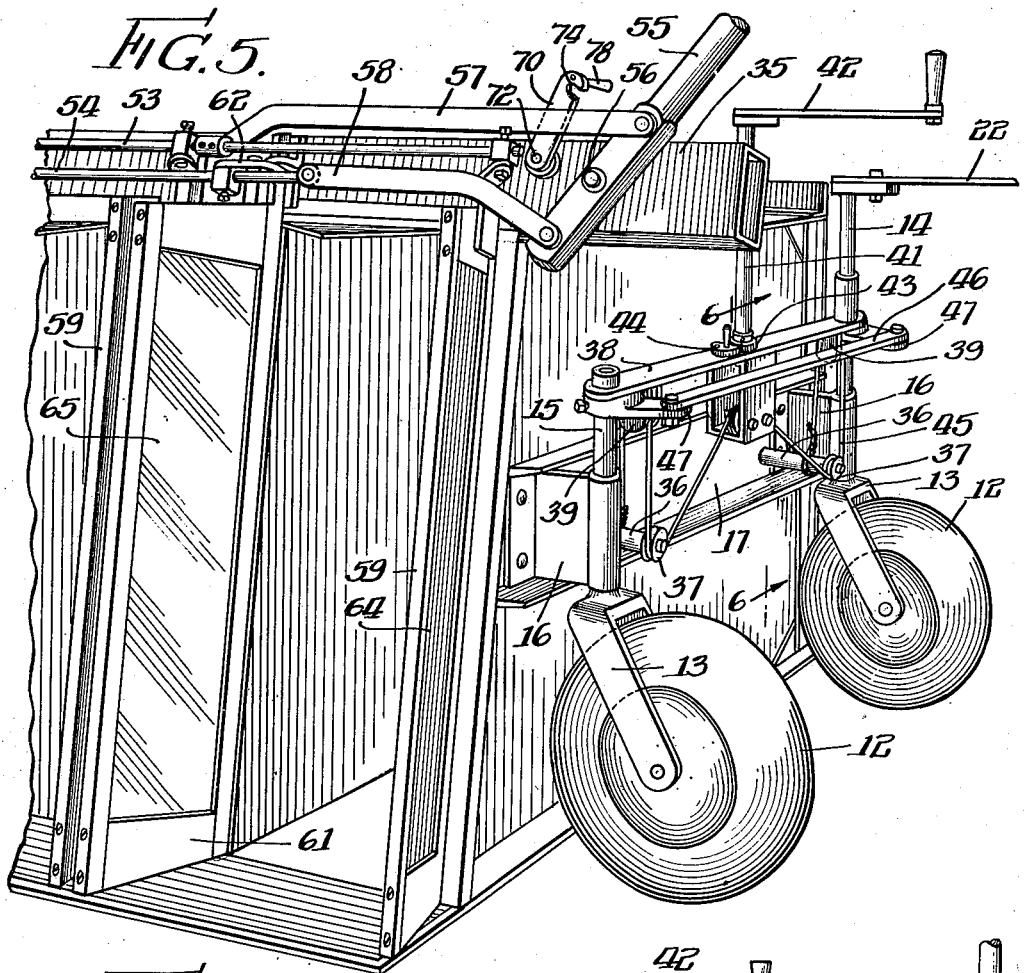
Fig. 5 is a partial perspective of a box constructed in accordance with another embodiment of the invention.

This application is a continuation-in-part of my copending application, Serial No. 43,815, filed October 7, 1935, which issued April 25, 1939, as United States Letters Patent No. 2,156,043.

Referring now to the drawings, and first to Figs. 1 to 4 inclusive thereof, it will be seen that the starting device illustrated comprises a box or cabinet structure 10 of generally rectangular form, but having its front face 11 sloping downwardly and forwardly. The box is constructed by assembling top and bottom panels and end panels upon a suitable frame assembly, and the rear and front of the box are provided with doors whereby to form an inclosed cabinet structure. The interior of the box is divided into a series of alined individual compartments extending from the rear to the front of the box into which the racing animals, such as dogs, may be placed. The movements of the dogs to and from the compartments are controlled by door mechanisms later to be more specifically described.

In accordance with the invention the entire box structure is rendered mobile so that it may be moved readily from place to place, and also quickly and firmly arranged in any desired starting position, as the occasion may require. To this end the box is provided with sets of wheels 12 mounted at each end thereof. The wheel assemblies at each end of the box are preferably the same, and a description of one will suffice for both. The wheel axles for each wheel assembly are carried by fork members 13 fixed to a pair of vertically disposed shafts 14 and 15. These shafts are mounted for pivotal movement in brackets 16 secured to a cross frame member 17 on the end of the box. The shafts are provided at their lower ends with a pair of rearwardly extending arms 18, Fig. 4, secured to the shafts against rotational movement with respect thereto by clamping bolts 19. The ends of the arms 18 are connected for corresponding movement by a tie-rod 20, the tie-rod being connected to the arms by means of threaded connections 21. A steering arm or lever 22 is non-rotatably secured to the upper end of shaft 14 by means of a bracket 23.

In operation the wheel assembly may be conveniently steered, as the box is pushed or otherwise moved from place to place on its wheel mountings, by means of the steering lever 22. As the steering lever is swung horizontally to the right or to the left, the shaft 14, to which it is rigidly secured, will be correspondingly rotated within the bracket 16, and by means of the tie-rod connection 18—20, the shaft 15 will be rotated in the same manner. The adjustments 21 may be manipulated at any time to maintain the two wheels in accurate parallel alinement. Due to the fact that each end of the box is provided with a wheel assembly controlled by its own individual steering lever, each end of the box can be independently directed, and the entire starting box can be readily maneuvered and moved within relatively small spaces.

The shafts 14 and 15 are connected adjacent their upper ends by a cross member 25. The cross member is pivotally secured at its ends to the shafts, but is constrained from longitudinal movement with respect to the shafts by sets of collars 26 and 27 which are pinned or otherwise secured to the shafts. The central portion of the cross member 25 is provided with a downwardly projecting rack bar 28 slidable within a gear housing 29 secured to the box frame member 17. The rack 28 is in geared engagement with a gear wheel 30 carried within the gear housing upon a pivotally mounted shaft 31, the outer end of which is secured to a control lever 32. The control lever is adapted to be locked in its lowered position, as shown in Fig. 1, by means of a locking bracket 33 suitably secured to the end of the box, the locking bracket being provided with a notch 34 into which the control lever may be engaged.

In operation the wheels may be readily raised relative to the starting box from the position of Fig. 2, wherein the box is fully mobile upon its wheels 12, to the position of Fig. 3, wherein the wheels are in inoperative raised position and the box is firmly supported with its base resting on the ground, merely by the manipulation of the control lever 32. As the control lever is moved from its lowered position of Fig. 2 to its raised position of Fig. 3, the shaft 31 will be rotated, and due to the geared connection between the gear wheel 30 and the rack 28, the cross member 25 for the wheel frame will be raised relative to the box whereby to lift the wheels and to permit the box to be lowered into engagement with the ground. The control lever may be locked in its lowered position, as shown in Figs. 1, 2 and 4, by means of the locking bracket 33. This insures that the box will not be inadvertently lowered while being transported upon its wheel mountings.

The wheel assemblies at each end of the box render it fully mobile so that it may be quickly and easily moved to any desired position. The various races to be run in sequence are frequently of different lengths, and the present invention avoids the necessity of having a plurality of starting boxes, by providing a mobile unit which may be moved to different starting positions. When it is desired to clear the track, the box may be readily removed. The starting box may be provided with an extension, see for example extension 35, Fig. 5, adapted for engagement with a fixed positioning bar provided on the race track, to insure that the box will be accurately located in starting position. The wheel assemblies provide a ready means by which the box may be accurately positioned with respect to such locating bar or similar device. When desired, the wheels may be quickly raised to inoperative position, whereby to bring the box into firm engagement with the ground against any possible inadvertent movement from the starting position.

Figure 6:
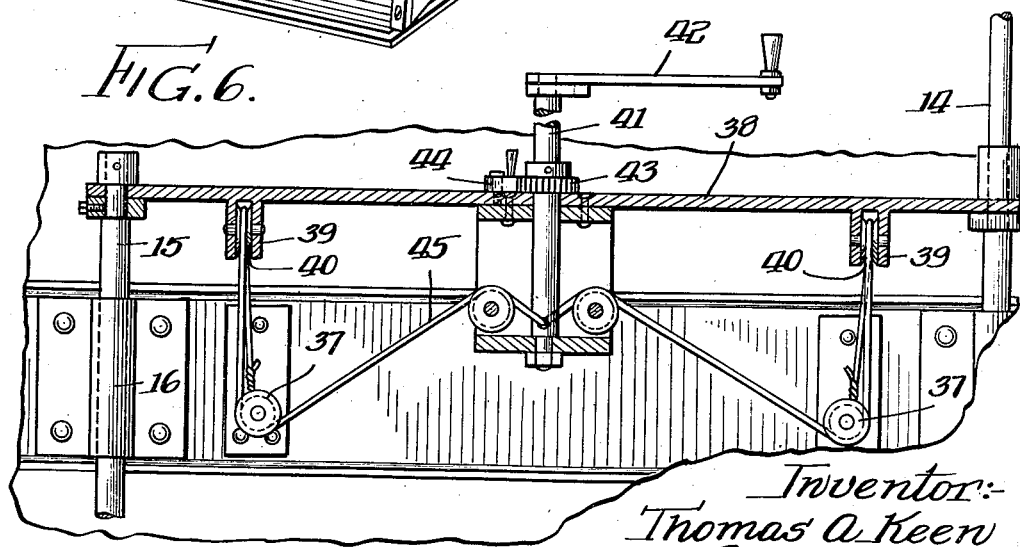
Fig. 6 is an end view of a portion of Fig. 5, with parts broken away.

In Figs. 5 and 6 of the drawings an embodiment of the invention is provided, generally similar to that previously described, except that a different means is provided for lifting the wheels 12 relative to the box. In this instance the lifting mechanism is of the crank and cable type. The cross frame 17 of the box carries a pair of projecting studs 36 on the ends of which pulley wheels 37 are rotatably mounted. A cross member 38 rotatably connected to the shafts 14 and 15 but secured against longitudinal displacement with respect thereto, as in the case of the cross member 25 in the embodiment of the invention previously described, carries a pair of depending brackets 39 upon which a second set of pulley wheels 40 are mounted. The crank shaft 41 having a crank handle 42 is rotatably mounted on the cross member 38. The crank shaft has secured thereto a ratchet wheel 43 cooperating with a retaining pawl 44 pivotally mounted upon the cross member 38. A cable 45 is suitably anchored at one end to one of the studs 36. From this point of anchorage it passes over associated pulley wheels 40 and 37, then through the lower end of the crank shaft, as shown in Fig. 6, and then over the other pulley wheels 37 and 40, being anchored at its other end to the second stud 36.

In operation the crank shaft 41 may be rotated by the crank 42 to wind the cable upon the lower end of the crank shaft. This causes the studs 36, and correspondingly the starting box, to be raised relative to the wheel frame whereby to lower the wheels into effective position for transit of the box. The holding pawl 44 may be rendered effective upon the ratchet wheel 43 to prevent the crank from reverse rotation during box transit. When it is desired to lower the box into engagement with the ground, holding pawl 44 is released, and the crank 42 reversely rotated. The steering mechanism is the same as in the embodiment previously described, except that the tie-bar 46 is secured to outwardly projecting arms 47 at the upper end of the wheel frame.

The door structure will be best understood by reference to Fig. 5 and Figs. 7 to 10 inclusive of the drawings. As previously indicated, the interior of the box is separated by baffle walls 50 into a plurality of compartments running from the rear to the front of the box, for the reception of the racing dogs. As will be seen by reference to Fig. 7, there is a space 51 between adjacent compartments to allow for the proper opening movement of the doors at the front of the compartments and to allow for sufficient room between the dogs as they leave the starting box, it being understood that the compartments are relatively narrow so that the dogs must face forwardly while in them, the position in which they enter through the rear. The rear of the compartments may be closed by any suitable means, such as by vertically slidable doors (not shown), which may be individually closed for each compartment after the dogs are placed therein.

The means for opening the doors at the front of the compartments simultaneously to start the race comprises a pair of reciprocable rods 53 and 54 operated from a door control lever 55, pivoted to the box upon the pivot 56. A pair of links 57 and 58 are pivotally secured at one of their ends to the control lever, above and below the pivot 56, and secured at the other of their ends to the rods 53 and 54 respectively. The pivotally mounted right hand doors 59 of the several compartments carry arms 60 which are pivotally secured to the upper rod 53, whereas the pivotally mounted left hand doors 61 carry arms 62 pivotally connected to the lower rod 54. All of the doors may be simultaneously opened by moving the control lever 55 from its left hand position, as shown in Fig. 7, to its right hand position as shown in Fig. 8. During this pivotal movement of the control lever about the pivot 56, the upper rod 53 will be pulled to the right by the arm 57 and the lower rod 54 pushed to the left by arm 58, causing a simultaneous opening movement of all the front compartment doors. The doors may be closed into engagement with the abutment pieces 63 by reverse movement of lever 55.

The lever 70, pivoted as at 72 upon the extension 35 (Fig. 5), is notched at its free end as at 74 to provide a catch adapted to engage with the pin 76 on the lever 55. The pin 76 is shown more clearly in Fig. 8 and is adapted to be engaged by the notch 74 when the lever 55 is in its counterclockwise position or, in other words, when the doors are all closed. The lever 70 also carries a handle 78 which may be raised to lift the catch from engagement with the pin 76 so that the doors may be swung open at the start of a race.

A very important feature of the invention is the door arrangement which insures rapid opening and that the dogs' attention will be directed in the proper manner while in the compartments. As will be best seen by reference to Figs. 7 and 9, the doors, when in closed position, do not lie in a common plane, but are disposed at substantially ninty degrees with respect to each other. By virtue of this V-mounting of the doors, their abutting edges will experience a material separation immediately as the doors are swung on their pivots in their opening movement. The lateral separation between the outer edges of the doors for any given angular door swinging movement will be much greater than if the doors were swung into closed position into a common plane. The V-arrangement of the doors extends along the entire height or length thereof which insures that there will be rapid opening movement along the entire door length, at the top as well as at the bottom. It is to be noted that the doors are not vertically disposed, but extend forward farther at the bottom than at the top, to conform with the sloping front face 11 of the box.

The right hand doors 59 have an opaque panel 64 mounted therein, whereas the left-hand doors 61 have a transparent central panel 65 of shatter-proof glass or the like. By this means the attention of the dogs within the compartments will be directed to the right, the direction in which the lure may be made to approach, and at the same time the line of vision between the individual compartments is obstructed by the opaque panels 64. The attention of the racing animals is thus properly directed, and distraction is avoided. Obviously the position of the opaque and transparent panels could be reversed, if desired, to oppositely direct the dogs' attention.

Various modifications may be made in the specific structural embodiments of the invention above described for purposes of illustration, without departing from the spirit of the invention. Also, certain principles of the invention may be utilized for other purposes than those hereinbefore specifically set forth. Accordingly the invention is not to be limited to the embodiments and uses heretofore described, but only as indicated in the following claims.

The invention is hereby claimed as follows:

1. A starting device for animal racing and the like comprising a box structure separated into a plurality of individual compartments, a pair of doors swingingly mounted for closing one end of each of said compartments, said doors when in closed position being in V-arrangement along the entire length thereof with their meeting edges throughout their entire length located forwardly of said mounting means.

2. A starting device for animal racing and the like comprising a box structure separated into a plurality of individual compartments, a pair of doors oppositely swingingly mounted for closing one end of each of said compartments, said doors when in closed position lying in planes substantially perpendicularly disposed and having their meeting edges arranged forwardly of said swinging doors.

3. A starting device for animal racing and the like comprising a box structure separated into a plurality of individual compartments, a pair of swinging doors for closing one end of each of said compartments, said doors being swingable about spaced axes and when in closed position being in V-arrangement along the entire length thereof with their meeting edges arranged forwardly of said axes, and the lower ends of said doors projectingly forwardly farther than the upper ends of said doors.

4. A starting device for animal racing and the like comprising a box structure separated into a plurality of individual compartments, each compartment having an opening, a pair of swinging doors for each of said openings, said pairs of doors being hingedly mounted adjacent opposite side edges of the openings and being arranged to provide meeting edges, which meeting edges in closed position meet, throughout their length, a substantial distance forwardly of the hinge means whereby to provide starting doors capable of being rapidly moved to full open position.

5. A starting device for animal racing and the like comprising a box structure separated into a plurality of individual compartments, each compartment having an opening, a pair of swinging doors for each of said openings, said pairs of doors being hingedly mounted adjacent opposite side edges of the openings and being arranged to provide meeting edges, which meeting edges in closed position meet, throughout their length, a substantial distance forwardly of the hinge means whereby to provide starting doors capable of being rapidly moved to full open position, said meeting edges being so arranged in closed position that the lower portions thereof project forwardly a substantial distance beyond the upper edges.

6. A starting device for animal racing and the like comprising a box structure separated into a plurality of individual compartments, a pair of doors swingingly mounted for closing one end of each of said compartments, said doors when in closed position being in V-arrangement along the entire length thereof with their meeting edges throughout their entire length being located forwardly of said mounting means, wheel mechanisms associated with said box structure to hold the box clear of the ground whereby to render it a mobile unit, means for lowering the box relative to the wheels to bring it into engagement with the ground and to render said wheels inoperative, and means for locking the box in raised position.

7. A starting device for animal racing and the like comprising a box structure separated into a plurality of individual compartments, a pair of swinging doors for closing one end of each of said compartments, said doors when in closed position being in V-arrangement along the entire length thereof with the apex of the V throughout its length in advance of the pivots, one door of each pair of doors being opaque and the other door of each pair having a transparent section, the opaque and transparent doors occupying the same relative position in each pair, wheel mechanisms associated with said box structure to hold the box clear of the ground whereby to render it a mobile unit, means for lowering the box relative to the wheels to bring it into engagement with the ground and to render said wheels inoperative, and means for locking the box in raised position.

THOMAS A. KEEN.